(12) United States Patent
Williams et al.

(10) Patent No.: US 10,938,206 B2
(45) Date of Patent: Mar. 2, 2021

(54) MODULAR POWER SYSTEM AND METHOD OF MITIGATING FAILURE PROPAGATION BETWEEN A PLURALITY OF MODULES IN A MODULAR POWER SYSTEM

(71) Applicant: GE Aviation Systems Limited, Gloucestershire (GB)

(72) Inventors: Ross Williams, Gloucestershire (GB); Peter James Handy, Gloucestershire (GB)

(73) Assignee: GE AVIATION SYSTEMS LIMITED, Gloucestershire (GB)

( * ) Notice: Subject to any disclaimer, the term of this patent is extended or adjusted under 35 U.S.C. 154(b) by 204 days.

(21) Appl. No.: 16/022,767

(22) Filed: Jun. 29, 2018

(65) Prior Publication Data

US 2019/0044326 A1 Feb. 7, 2019

(30) Foreign Application Priority Data

Aug. 4, 2017 (GB) ..................................... 1712528

(51) Int. Cl.
| | |
|---|---|
| *H02J 9/06* | (2006.01) |
| *H02J 1/10* | (2006.01) |
| *A62C 3/16* | (2006.01) |
| *A62C 3/08* | (2006.01) |
| *A62C 2/06* | (2006.01) |
| *H02J 9/00* | (2006.01) |

(52) U.S. Cl.
CPC ................ *H02J 1/10* (2013.01); *A62C 2/065* (2013.01); *A62C 3/08* (2013.01); *A62C 3/16* (2013.01); *H02J 9/00* (2013.01)

(58) Field of Classification Search
CPC ........ H02J 1/10; H02J 9/00; H02J 3/00; H02J 3/001; A62C 3/16; A62C 3/08; A62C 2/065; B64D 45/00; H02H 7/262; H05K 5/0026; H05K 5/0213; H05K 7/1495
See application file for complete search history.

(56) References Cited

U.S. PATENT DOCUMENTS

| | | |
|---|---|---|
| 6,002,584 A | 12/1999 | Messmer et al. |
| 6,130,381 A | 10/2000 | Keith et al. |
| 6,433,444 B1 | 8/2002 | de Vries |

(Continued)

FOREIGN PATENT DOCUMENTS

DE 102015007408 12/2016

*Primary Examiner* — Jared Fureman
*Assistant Examiner* — Emmanuel Dominique
(74) *Attorney, Agent, or Firm* — Wood IP LLC (57) ABSTRACT

A modular power system includes a plurality of electronic modules, the plurality of modules is arranged in a manner that each of the modules is detachable from the others, and adjacent modules are in fluid communication with each other through a passage, and at least one thermally activated element is disposed within each said passage. In normal operation, the thermally activated element is in an unexpanded state, and fluid communication between the plurality of modules is allowable through a space between the thermally activated element and the passage, and in a failure event when at least one of the modules fails, the thermally activated element is activated and expanded to block the passage between the failed module and the other modules. A method of mitigating failure propagation between a plurality of modules in the modular power system is also described.

20 Claims, 6 Drawing Sheets

(56) References Cited

U.S. PATENT DOCUMENTS

| | | |
|---|---|---|
| 6,548,753 B1 | 4/2003 | Blackmon, Jr. et al. |
| 6,831,842 B1 | 12/2004 | Mendoza et al. |
| 7,291,784 B2 | 11/2007 | Moore et al. |
| 7,365,974 B2 | 4/2008 | Hartung |
| 8,541,126 B2 * | 9/2013 | Hermann .......... H01M 10/6555 429/120 |
| 8,846,235 B2 | 9/2014 | Yokoyama et al. |
| 8,932,739 B2 | 1/2015 | Hermann et al. |
| 8,999,561 B2 | 4/2015 | Vissers et al. |
| 9,093,203 B2 | 7/2015 | Depping et al. |
| 9,093,726 B2 | 7/2015 | Prilutsky et al. |
| 9,253,870 B2 | 2/2016 | Willmot et al. |
| 2006/0164795 A1 | 7/2006 | Jones et al. |
| 2011/0293986 A1 | 12/2011 | Kozu |
| 2015/0221914 A1 | 8/2015 | Page et al. |
| 2016/0234964 A1 | 8/2016 | Sporer |
| 2016/0333194 A1 | 11/2016 | Phlegm et al. |
| 2016/0336627 A1 | 11/2016 | Syed et al. |
| 2016/0365553 A1 | 12/2016 | Kountz et al. |
| 2017/0338529 A1 * | 11/2017 | Speichermann ...... H01M 10/48 |
| 2018/0323413 A1 * | 11/2018 | Nicholls ................. B60L 58/24 |
| 2020/0083706 A1 * | 3/2020 | Paskov .................... H02J 7/00 |

* cited by examiner

MODULAR POWER SYSTEM AND METHOD OF MITIGATING FAILURE PROPAGATION BETWEEN A PLURALITY OF MODULES IN A MODULAR POWER SYSTEM

BACKGROUND

Embodiments of the disclosure relate generally to a modular power system and a method of mitigating failure propagation between a plurality of modules in the system, and more particularly relate to a modular distribution power system used in avionics area.

An aircraft requires electronics in order to control the various equipment needed to enable the aircraft to fly. Many of the electronics are housed in separate modules, whereby a plurality of modules are fitted into one or more cabinets. The cabinets can be line replaceable units (LRU). Each defective LRU can typically be replaced independently. An LRU with a plurality of modules can also be used in other applications.

Conventionally, modules in an LRU may be interconnected with each other, and air is shared between the modules via a pressure relief device to meet a pressure balance. The air also flow around the electronics within the modules to prevent the electronics from being overheated; therefore, if one of the modules experiences a failure and expels heated air and ejecta, by virtue of the shared air, the heated air and ejecta may propagate from the failed electronics to electronics in other modules.

BRIEF DESCRIPTION

In accordance with one embodiment disclosed herein, A modular power system includes a plurality of electronic modules, the plurality of modules is arranged in a manner that each of the modules is detachable from the others, and adjacent modules are in fluid communication with each other through a passage, and at least one thermally activated element is disposed within each said passage. In normal operation, the thermally activated element is in an unexpanded state, and fluid communication between the plurality of modules is allowable through a space between the thermally activated element and the passage, and in a failure event when at least one of the modules fails, the thermally activated element is activated and expanded to block the passage between the failed module and the other modules. A method of mitigating failure propagation between a plurality of modules in the modular power system is also described.

In accordance with another embodiment disclosed herein, a method of mitigating failure propagation between a plurality of electronic modules in a modular power system is provided. The method includes arranging the plurality of modules in a manner that each of the modules is detachable from the others and adjacent modules are in fluid communication with each other through a passage, disposing at least one thermally activated element within each said passage, driving an air flow between the modules through a space between the thermally activated element and the passage in normal operation, and when at least one of the modules fails, driving the thermally activated element to expand to block the passage between the failed module and the other modules.

DRAWINGS

The accompanying drawings, which are incorporated herein and form part of the specification, illustrate the present disclosure and, together with the description, further serve to explain the principles of the disclosure and to enable a person skilled in the relevant art(s) to make and use the disclosure.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer.

Figure 1:
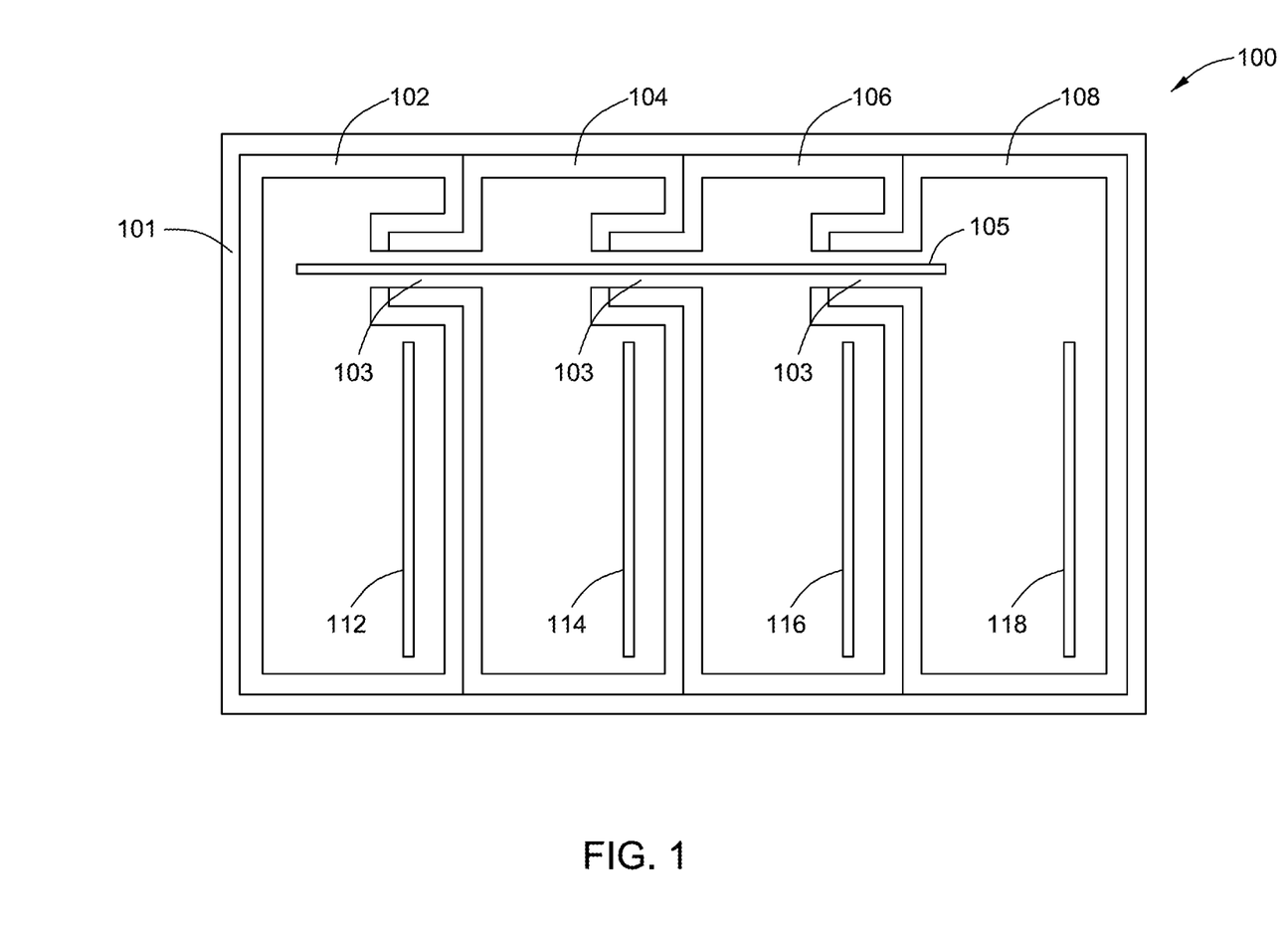
FIG. 1 is an example cross sectional view of a modular power system.

FIG. 1 is a cross sectional view of a modular power system 100. The modular power system 100 may be any kind of power systems in which the air is shared between modules, such as a modular distribution system, a modular power conversion system and a power supply system. In one embodiment, the module power system 100 is a Line Replaceable Unit (LRU) including a LRU boundary 101. The modular power system 100 includes four electronic modules 102, 104, 106, 108 arranged in a manner that each of the modules is detachable from the others. The modules may be connected in any of a variety of detachable ways, including but not limited to male-female connecting, clamping and clipping. Electronic printed circuit board (PCB) assemblies 112, 114, 116, 118 are electrically connected to and accommodated in interior cavities of the modules 102, 104, 106, 108, respectively. The number of the modules or electronic PCB assemblies is not limited herein. In some embodiments, each electronic PCB assembly 112, 114, 116, 118 includes at least one electronic device (not shown), the electronic devices of different electronic PCB assemblies can be the same or different.

In some exemplary embodiments, adjacent modules are in fluid communication with each other through a passage 103. In these embodiments, the passages 103 function as a fluid communication parts of the modules. Driven and controlled by a control module (not shown) coupled to the boundary 101, air can move freely between the modules 102, 104, 106, 108 through the passages 103. The control module may include at least one pressure relief device which can balance a pressure inside the modules to mitigate pressure effects threatening the mechanical integrity of the modules 102, 104, 106, 108 and the modular power system 100. In some embodiments, the system 100 may have one single pressure relief device coupled to and in fluid communication with one of the modules 102, 104, 106, 108. In other embodiments, the system 100 may have multiple pressure relief devices coupled to and in fluid communication with, for example, modules 102 and 108, respectively. In some embodiments, the modular power system 100 is configured to have the air flow through the modules 102, 104, 106, 108 and the passages 103 to cool the electronic PCB assemblies 112, 114, 116, 118.

The modular power system 100 also includes a removeable element 105 passing through each of the passages 103, and the removeable element 105 includes at least one PCB moveably and electrically connected to the electronic PCB assemblies 112, 114, 116, 118.

Figure 2:
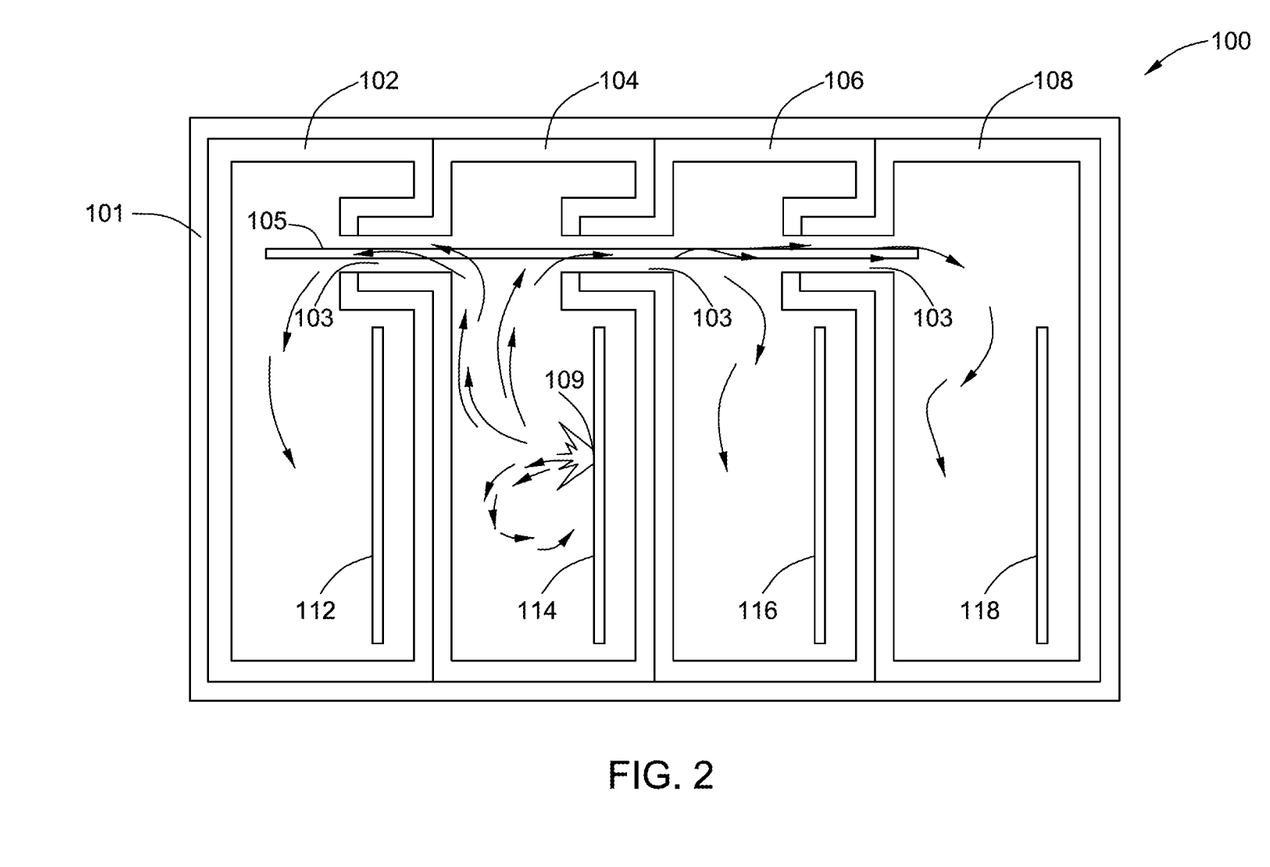
FIG. 2 is an example cross sectional view of a modular power system illustrating a failure event.

As shown in FIG. 1, in normal operation, the air moves freely between the modules 102, 104, 106, 108 through the passages 103. FIG. 2 illustrates the modular power system in a failure event when at least one of the modules fails. Generally, once the electronic in one module fails, the module is regarded as a failed module. In conjunction with FIG. 2, an exemplary failure event is described hereinafter by taking the module 104 as an example of a failed module. The electronic PCB assembly 114 in the failed module 104 expels significantly heated air, smoke and potentially debris, expelled material or ejecta, which may propagate from the failed module 104 to otherwise healthy modules 102, 106 and 108. In some exemplary embodiments, an arc fault occurs in the module 104, and high temperature ionized air and potentially ejecta are expelled from a failure site 109 of the electronic PCB assembly 114 and flows to the modules 102, 106 and 108.

Figure 3:
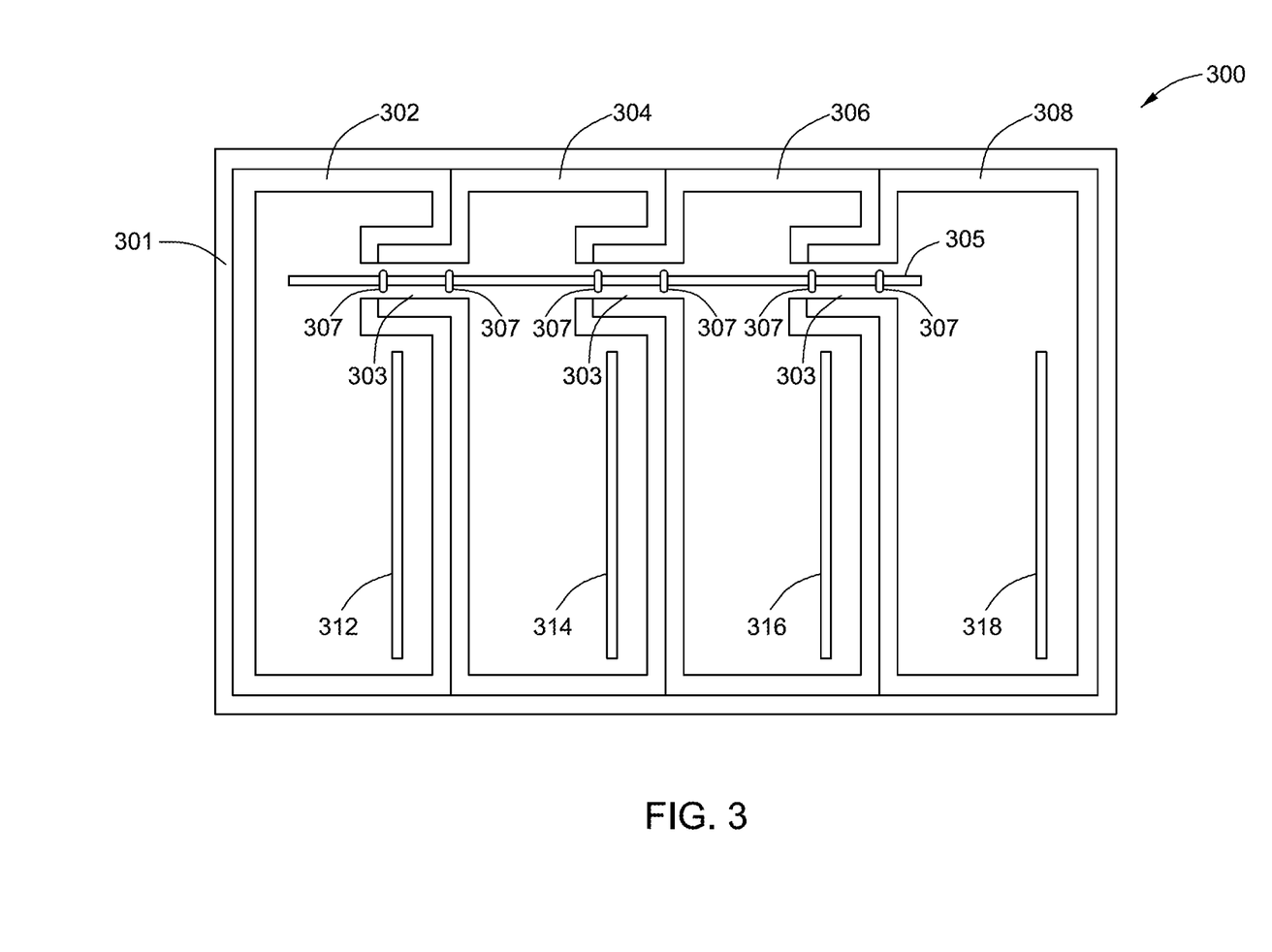
FIG. 3 is an example cross sectional view of a modular power system in accordance with aspects described herein.

FIG. 3 is a cross sectional view of a modular power system 300 according to an exemplary embodiment of the present disclosure. The modular power system 300 includes four electronic modules 302, 304, 306, 308, which are arranged in a manner that each of the modules is detachable from the others, and adjacent modules are in fluid communication with each other through a passage 303. Electronic PCB assemblies 312, 314, 316, 318 are electrically coupled to and accommodated in interior cavities of the modules 302, 304, 306, 308, respectively. The modular power system 300 also includes a removeable element 305 passing through each of the passages 303, and the removeable element 305 includes at least one PCB moveably and electrically connected to the electronic PCB assemblies 312, 314, 316, 318. There is at least one thermally activated element 307 disposed within each passage 303, and the thermally activated elements 307 are coupled to the removeable element 305. In some embodiments, the thermally activated elements 307 includes an intumescent material. For example, the intumescent material can include sodium silicates, graphite, glass fiber, carbonific material, spumific material, microporous carbonaceous foam or a combination thereof. The intumescent material may also have a quick response and be expandable rapidly when a temperature increases to and above a threshold temperature.

As shown in FIG. 3, in normal operation, the thermally activated elements 307 is in an unexpanded state, and fluid communication between the plurality of modules 302, 304, 306, 308 is allowable through a space between the thermally activated elements 307 and the passages 303.

Figure 4:
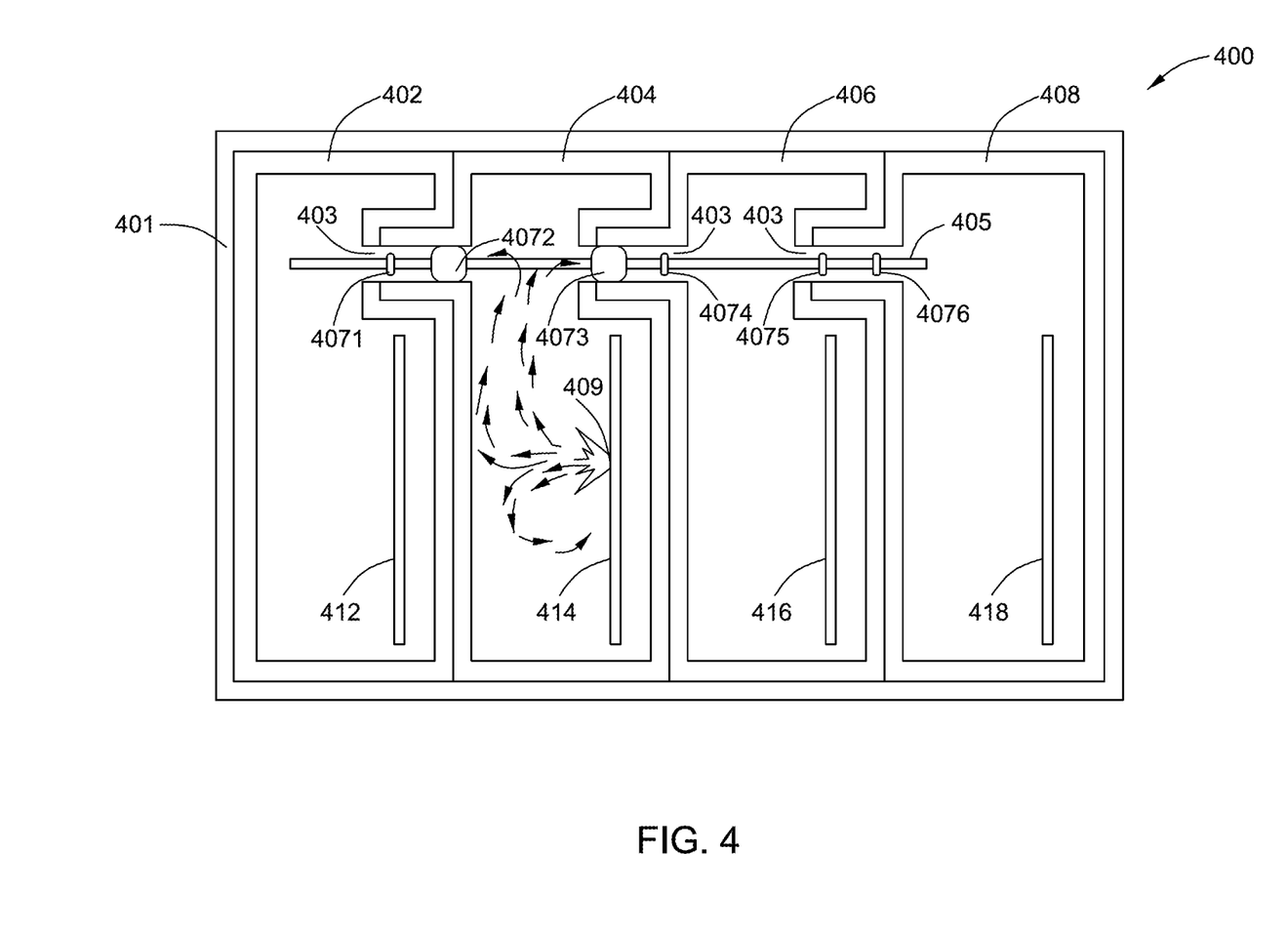
FIG. 4 is an example cross sectional view of a modular power system illustrating a failure event in accordance with aspects described herein.

As shown in FIG. 4, in the failure event, when a module 404 is failed, an electronic PCB assembly 414 in the failed module 404 expels significantly heated air and potentially ejecta, and the intumescent material of thermally activated elements 4072 and 4073 are activated by the thermal energy expelled from the electronic PCB assembly 414 of the failed module 404 and expanded to block passages 403 between the failed module 404 and the modules 402 and 406 adjacent to the failed module 404. In some exemplary embodiments, an arc fault occurs in the module 404, and high temperature ionized fluid and potentially ejecta are expelled from a failure site 409 of the electronic PCB assembly 414 and flows to the modules 402, 406 and 408. The intumescent material of the thermally activated elements 4072 and 4073 is expandable rapidly at, or above, a threshold temperature not higher than a temperature that the module 402, 404, 406, 408 is damaged. The intumescent material can be selected based on the threshold temperature determined by the operating environment of different products. In this embodiment, the threshold temperature is approximately between the range of 100-250° C.

Traditionally, intumescent material may be produced by wet laying an aqueous slurry of the intumescent substance onto a water-pervious support. It is hard to control the shape and thickness of the intumescent material by the wet-process, so the quality of the intumescent material would be not consistent in the application. In the exemplary embodiment shown in FIG. 4, the intumescent material of the thermally activated elements 4071-4076 can be pre-formed to a required shape in a process prior to being assembled into the removable element 405, which may mitigate the need for the wet process. Six pre-formed annular thermally activated elements 4071-4076 are wrapped around the removable element 405, and each passage 403 accommodates two of the annular thermally activated elements 4071-4076. Taking module 404 as an example of the failed module, the annular thermally activated elements 4072 and 4073 adjacent to the module 404 are activated by the high temperature air and expanded to block the passages 403 between the failed module 404 and the modules 402 and 406 adjacent to the failed module 404. This arrangement enables the corresponding thermally activated elements to respond rapidly when a failure happens at any one of the modules. In other embodiment, the annular thermally activated elements 4071 and/or 4074 may also be activated when the high temperature air flows fast. The number and the shape of the thermally activated elements are not limited herein. In some embodiments, the number of the thermally activated elements is an integer greater than or equal to 3, and the shape and size are designed based on the passages 403 and/or the application environment.

In some embodiments, the modular power system 400 includes multiple pressure relief devices coupled to and in fluid communication with the modules 402 and 408. In the failure event, the failed module 404 is sealed and no longer in fluid communication with the other modules. For example, the system 400 can include two pressure relief devices controlled by a control module (not shown) that can balance the pressure of the modules 402, 406 and 408 to mitigate pressure effects threatening the mechanical integrity of the modules and the modular power system 400. Additionally or alternatively, in some embodiments, the modular power system 400 can include one pressure relief device, for example, coupled the failed module 404.

Figure 5:
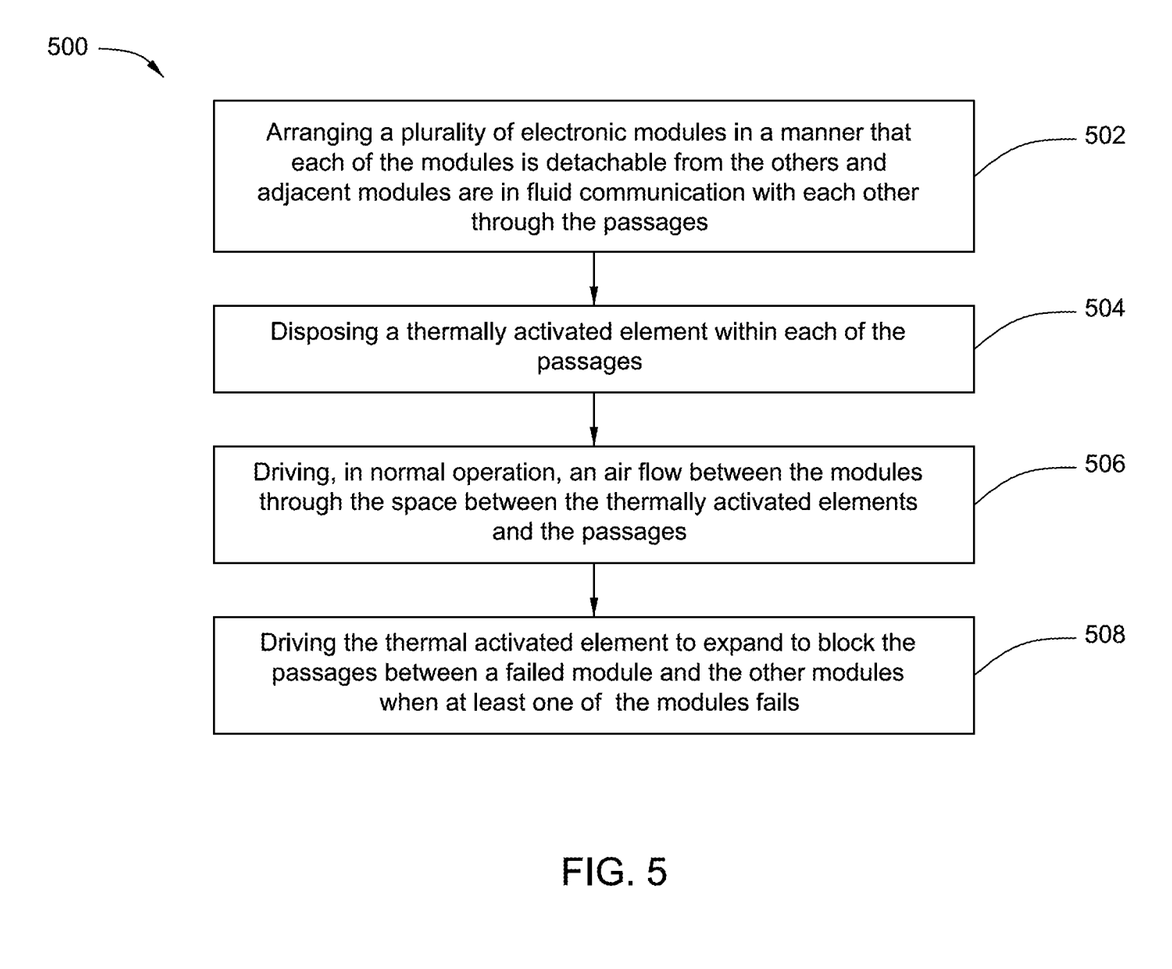
FIG. 5 is a flow chart of an exemplary method of mitigating failure propagation between a plurality of modules in a modular power system in accordance with aspects described herein.

FIG. 5 is a flow chart of an exemplary method 500 of mitigating failure propagation between a plurality of electronic modules in a modular power system. Referring to FIGS. 3-4 with FIG. 5, the method includes a step 502 of arranging a plurality of electronic modules 302, 304, 306, 308 in a manner that each of the modules 302, 304, 306, 308 is detachable from the others, and adjacent modules are in fluid communication with each other through the passages 303. The method further includes a step 504 of disposing a thermally activated element 307 within each of the passages 303, a step 506 of driving, in normal operation, an air flow between the modules 302, 304, 306, 308 through the space between the thermally activated elements 307 and the passages 303, and a step 508 of driving the thermal activated element 307 to expand to block the passages 303 between a failed module and the other modules when at least one of the modules fails.

In some embodiments, the thermally activated elements 307 are coupled to the modules 302, 304, 306, 308, and the modules 302, 304, 306, 308 includes a plurality of containers within the passages for accommodating the thermally activated elements 307, the container can be a receptacle, a groove or a slot. The thermally activated elements 307 can be pre-formed, and the number and shape of the plurality of receptacles are corresponding to the thermally activated elements 307. Once a module fails, the failed module and the thermally activated elements 307 may be replaced with new ones.

In some embodiments, the at least one thermally activated element 307 is disposed into the passages 303 by coupling the at least one thermally activated element 307 to a removeable element 305 passing through each of the passages. The thermally activated element 307 may be formed into a required shape, for example an annulus, before being coupled to the removeable element 305. In some embodiments, once a module fails, the failed module and the removeable element 305 may be replaced with new ones. The removeable element 305 and the thermally activated elements 307 coupled to the removeable element 305 may be assembled in a manner that the removeable element 305 and the thermally activated elements 307 can be disassembled from the other parts of the modular power system 300, along with the failed module.

Figure 6:
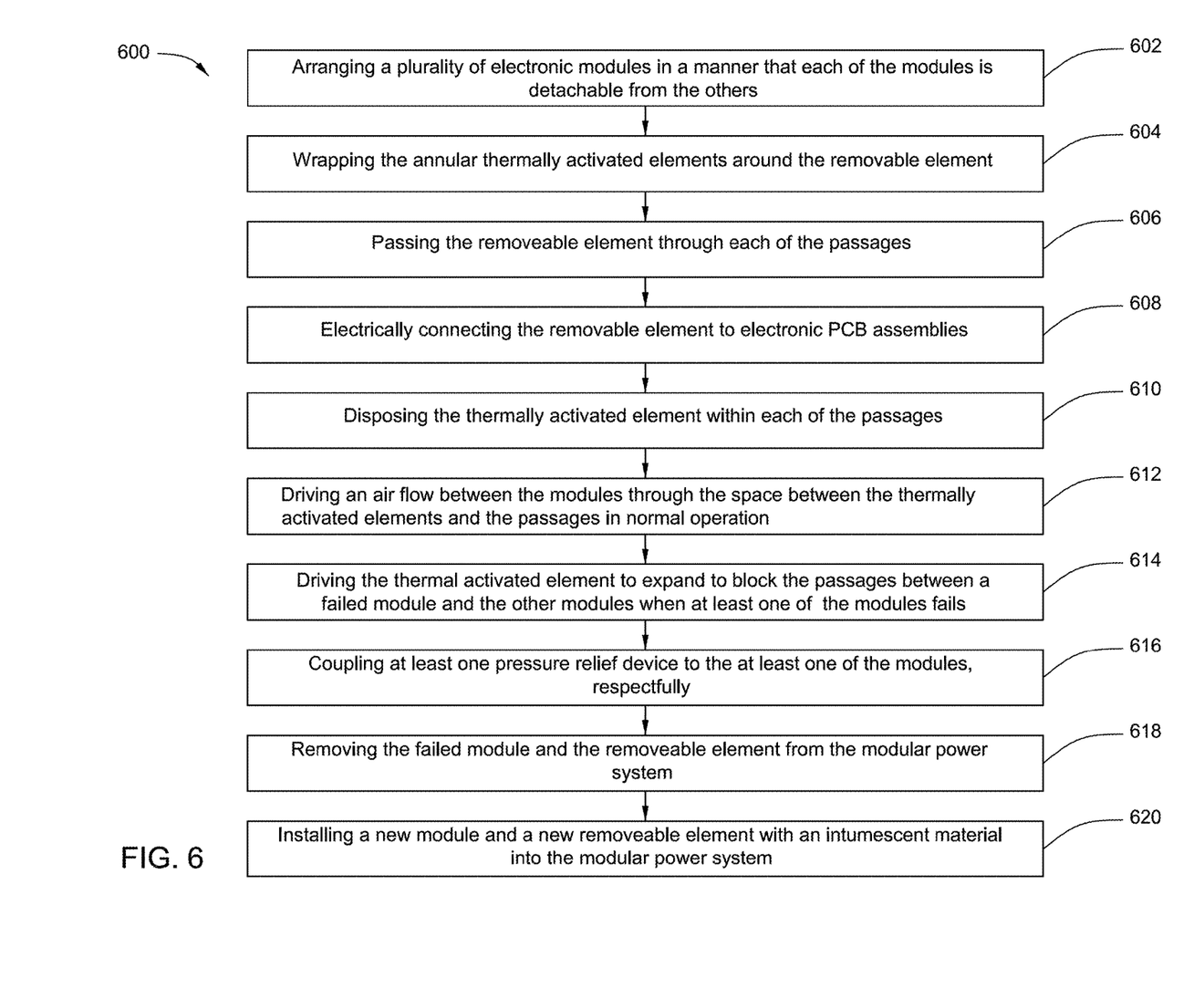
FIG. 6 is a flow chart of an exemplary method of mitigating failure propagation between a plurality of modules in a modular power system in accordance with aspects described herein.

For example, in an exemplary method 600 shown in FIG. 6, in step 602 a plurality of electronic modules 302, 304, 306, 308 are arranged in a manner that each of the modules 302, 304, 306, 308 is detachable from the others. In step 604, annular thermally activated elements 307 are disposed on, attached to or otherwise wrapped around the removable element 305. In step 606, the removeable element 305 is passed through each of the passages 303. In step 608, the removeable element 305 is electrically connected to electronic PCB assemblies 312, 314, 316, 318. In step 610, the thermally activated element 307 is disposed within each of the passages 303. In step 612, an air flows between the modules 302, 304, 306, 308 through the space between the thermally activated elements 307 and the passages 303 in normal operation. In step 614, the thermal activated element 307 is expanded to block the passages 303 between a failed module and the other modules in a failure event. In step 616, at least one pressure relief device is coupled to the at least one of the modules, respectfully, to mitigate pressure effects which may threat the mechanical integrity of the modular power system 400. In step 618, the failed module 404 and the removeable element 405 are removed from the modular power system 400 by open at least one plate of the boundary 401. In step 620, a new module and a new removeable element with an intumescent material are installed into the modular power system 400. In some embodiment, the expanded intumescent material on the replaced removeable element 405 can be removed straightforward or by some chemicals which may not damage the removeable element 405.

The above described power system and method have the below advantages: (1) the failure of a single module will not damage otherwise healthy modules, and the failed module can be removed and replaced independently from the module system, which can reduce the cost of rework in otherwise healthy modules. (2) The intumescent material is pre-formed, so it can be coupled to the removeable element fast. Once the failure occurs, the failed module and the removeable element can be replaced with a new module and a new removeable element with an intumescent material quickly to shorten the repair time.

While embodiments of the disclosure have been described herein, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A modular power system, comprising:
 a plurality of electronic modules arranged in a manner that each of the modules is detachable from the others, and adjacent modules are in fluid communication with each other through a passage;
 a removable element disposed perpendicular to the plurality of electronic modules and passing through each of the passages; and
 at least one thermally activated element separately disposed within each passage and wrapped around the removable element, wherein,
 in normal operation, each at least one thermally activated element is in an unexpanded state, and fluid communication between the plurality of electronic modules is allowable through a space between each at least one thermally activated element and the passages; and
 in a failure event when at least one of the modules fails, the at least one thermally activated element in an associated passage is activated and expanded to block the associated passage of the failed module from the other modules of the plurality of electronic modules.

2. The modular power system of claim 1, further comprising a removeable element passing through each of the passages, and the at least one thermally activated element is coupled to the removeable element.

3. The modular power system of claim 2, wherein the removeable element comprises a printed circuit board moveably coupled to at least one electronic printed circuit board assembly in an interior cavity of the electronic module.

4. The modular power system of claim 2, wherein the thermally activated element is pre-formed to a required shape before coupling to the removeable element, the required shape is an annulus.

5. The modular power system of claim 1, wherein the at least one thermally activated element is coupled to the modules.

6. The modular power system of claim 1, wherein each of the modules is replaceable in the failure event.

7. The modular power system of claim 1, further comprising a pressure relief device to mitigate pressure effects threatening a mechanical integrity of the modules and system.

8. The modular power system of claim 1, wherein the thermally activated element comprises an intumescent material.

9. The modular power system of claim 8, wherein the intumescent material is expandable at a threshold temperature not higher than a temperature that the module is damaged.

10. The modular power system of claim 9, wherein the intumescent material is expanded by the thermal energy expelled from the electronic module during the failure mode.

11. A method of mitigating failure propagation between a plurality of electronic modules in a modular power system, comprising:
    arranging the plurality of electronic modules in a manner that each of the modules is detachable from the others and adjacent modules are in fluid communication with each other through a passage;
    a removable element disposing perpendicular to the plurality of electronic modules and passing through each of the passages;
    separately disposing at least one thermally activated element within each passage and wrapped around the removable element;
    during normal operation, wherein each at least one thermally activated element is
    in an unexpanded state, driving an air flow between the plurality of electronic modules through a space between each at least one thermally activated element and the passages; and
    when at least one of the plurality of electronic modules fails, driving the at least one thermally activated element in an associated passage to be activated and to expand to block the associated passage of the failed module from the other modules of the plurality of electronic modules.

12. The method of claim 11, further comprising replacing the failed module with a new module.

13. The method of claim 11, wherein the at least one thermally activated element is coupled to the modules.

14. The method of claim 11, further comprising passing a removeable element through each of the passages, and the at least one thermally activated element is coupled to the removeable element.

15. The method of claim 14, further comprising forming the thermally activated element into a required shape before coupling to the removeable element, the required shape is an annulus.

16. The method of claim 14, further comprising replacing the removeable element with a new one in the failure event.

17. The method of claim 14, further comprising coupling a printed circuit board of the removeable element to at least one electronic printed circuit board assembly in an interior cavity of the electronic module.

18. The method of claim 11 wherein the thermally activated element comprises an intumescent material.

19. The method of claim 18, wherein the intumescent material includes at least one of sodium silicates, graphite, glass fiber, carbonific material, spumific material or microporous carbonaceous foam.

20. The method of claim 18, further comprising driving the intumescent material to expand at a threshold temperature not higher than a temperature that the module is damaged.

* * * * *